United States Patent [19]

Roerty

[11] 3,919,632
[45] Nov. 11, 1975

[54] FLUID DAMPING SYSTEM FOR ANALOG INSTRUMENTS
[75] Inventor: Dennis F. Roerty, Bayonne, N.J.
[73] Assignee: Westinghouse Electric Corporation, Pittsburgh, Pa.
[22] Filed: Aug. 30, 1974
[21] Appl. No.: 502,128

[52] U.S. Cl. .............................. 324/125; 73/430
[51] Int. Cl.² ..................... G01R 1/14; G01D 11/10
[58] Field of Search ..................... 324/125; 73/430

[56] References Cited
UNITED STATES PATENTS
1,642,516   9/1927   Simpson .......................... 324/125
1,762,774   6/1930   Fry .................................. 324/93
1,795,498   3/1931   Mathison ........................ 324/93

*Primary Examiner*—Alfred E. Smith
*Assistant Examiner*—Ernest F. Karlsen
*Attorney, Agent, or Firm*—J. L. Stoughton

[57] ABSTRACT

A fluid damped electrical measuring instrument in which damping is attained by the movement of a projecting part, from a projecting arm that is carried by the rotor, through damping fluid contained within an annularly shaped outwardly open channel fixed with respect to the stator.

13 Claims, 3 Drawing Figures

FLUID DAMPING SYSTEM FOR ANALOG INSTRUMENTS

BACKGROUND OF THE INVENTION

This invention relates to fluid damped electrical measuring instruments. In electrical instruments of the prior art, it is common to provide some means for damping. U.S. Pat. No. 3,155,904 to V. S. Thomander dated Nov. 3, 1964, is an example of a magnetic damping system. Fluid damping arrangements are illustrated in U.S. Pat. No. 2,719,264 to G. E. R. Murray dated Sept. 27, 1955; U.S. Pat. No. 3,011,126 to A. C. Krabacher dated Nov. 28, 1961; and U.S. Pat. No. 3,111,623 to V. S. Thomander dated Nov. 19, 1963.

BRIEF SUMMARY OF THE INVENTION

The invention is a new and improved fluid damping means for electrical measuring instruments in which damping is achieved by the movement of at least a portion of a damping member, carried by one of the stator and rotor units through a fluid that is contained within a receptacle member fixed with respect to the other unit.

DESCRIPTION OF THE PREFERRED EMBODIMENT

Figure 1:
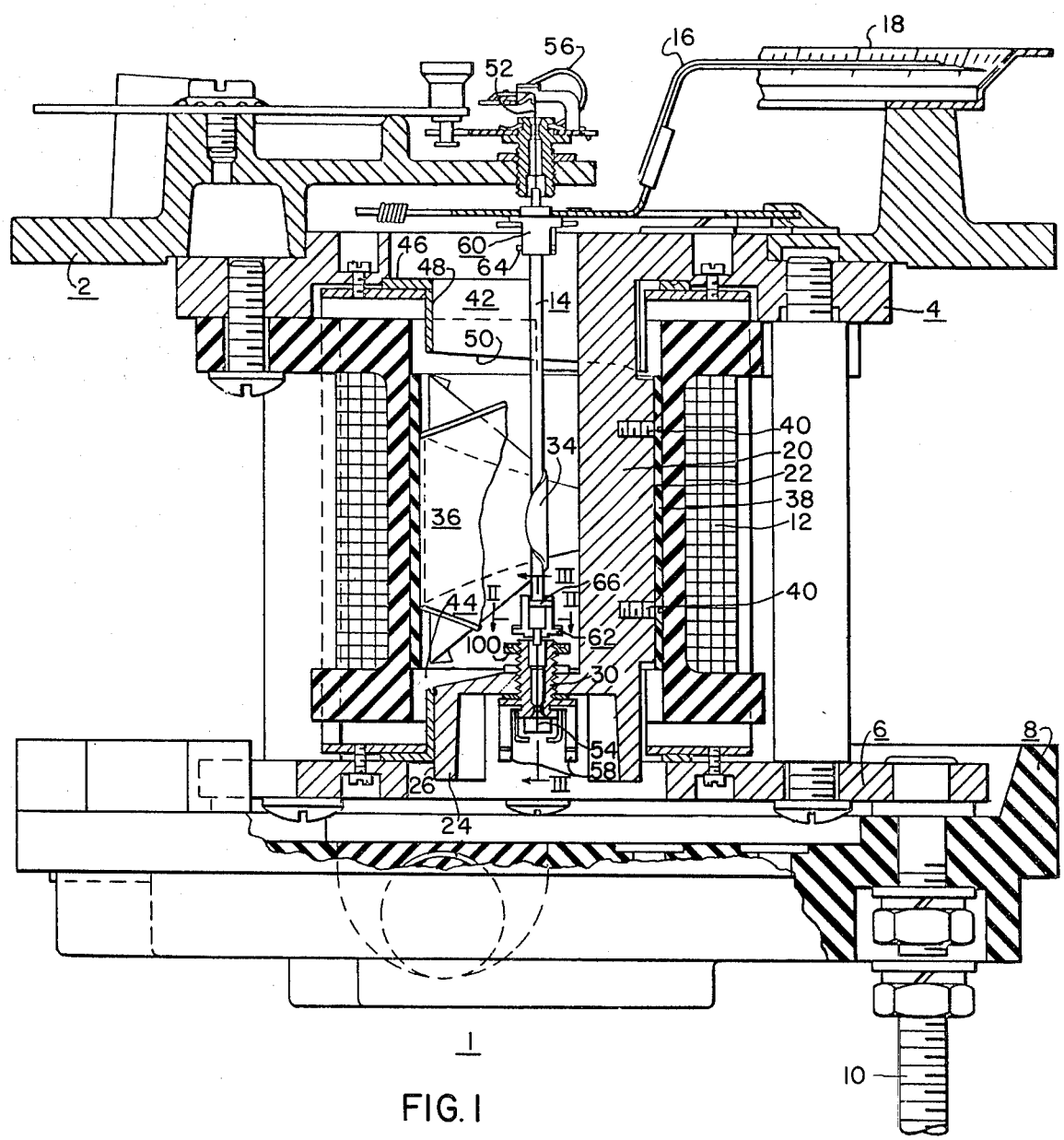
FIG. 1 is a view substantially in central section showing an instrument embodying the invention.

Referring to the drawings by characters of reference, and to FIG. 1 in particular, the numeral 1 designates generally an electrical instrument of the repulsion iron vane type, similar to the electrical instrument described in U.S. Pat. No. 3,155,904, which is assigned to the same assignee as the present application, but which is magnetically damped instead of fluid damped in accordance with the present invention. It is to be understood that the invention may also be embodied within electrical measuring instruments other than that shown in the preferred embodiment.

The instrument 1 comprises a front frame member 2, a rear frame member 4, a sub-base member 6, and a base support 8. The members 2, 4, and 6 are fabricated of non-magnetic material and may conveniently be die-cast. The base support 8 may be of molded plastic and carries a pair of terminals 10 (only one of which is visible in FIG. 1) to which a flux producing coil 12 is connected, coil 12 being located coaxially with shaft 14. An indicator arm 16 and a calibrated dial plate 18 are also provided.

The rear frame member 4 comprises a post 20 and a circularly cylindrical bracket 24. The post 20 has a cross-section shaped generally in the form of a sector or a circle with a portion of the apex or pointed section of the sector cut away to provide space for the shaft 14. The outer surface 22 of post 20 forms a circular arc having its center of curvature coaxial with the axis of shaft 14. Bracket 24 has an outer surface 26 which is circularly cylindrical in shape and a threaded aperture 28 that is coaxially arranged with the center of curvature of surface 26 and axis of shaft 14. A rear suspension mounting screw 30, having a circularly cylindrical aperture 32, is threaded into aperture 28.

A first or movable iron vane 34 is mounted on shaft 14 for rotation relative to a second or repulsion vane 36 which is cemented or otherwise secured to the inner surface of a hollow circularly cylindrical member 38, which may comprise a section of suitable non-magnetic phenolic tubing. Member 38 is securely held to surface 22 of post 20 by means of screws 40.

Front and rear attraction vanes 42 and 44 are also provided and these attraction vanes are substantially mirror copies of each other. Each of the vanes 42 and 44 comprises a flat annular ring portion 46 and a sleeve or tubular portion 48 terminating in an end surface 50 which forms a portion of a helix.

The invention is illustrated as being embodied within an instrument having a taut band suspension, but it is to be understood that the invention applies to other types of mounting arrangements, such as a pivot and jewel mounting with helical force exerting springs. The shaft 14 is pivotally supported on front and rear taut suspension bands 52 and 54 such that bands 52 and 54 are coaxial with the axis of shaft 14. The bands 52 and 54 are resiliently held at their outer end portions by tension springs 56 and 58. The inner ends of the taut bands 52 and 54 are secured to towers 60 and 62, which are suitably secured to adjacent end portions 64 and 66 of the shaft 14. The fastening of the taut bands to the towers and tension springs is to be done in the manner taught by U.S. Pat. No. 3,111,623, which is assigned to the same assignee as the present application.

Tower assembly 60 is substantially similar to tower assembly 62, except that the two towers are displaced from each other angularly about the axis of rotation of the shaft 14 by a distance of 90°. Each tower has a set of legs 68 and 70 that is designed to extend over one of the end portions 64 and 66 of shaft 14 and which may be used to secure each tower to its respective end of the shaft 14.

Towers 60 and 62 are of stepped formation, and each tower has a circularly cylindrical aperture 71. To facilitate explanation, only tower 62 will be described in detail. Thus, in tower 62 a tubular portion 72 projects from a cylindrical portion 74 which in turn projects from a cylindrical base portion 76. The base 76 has an internal cylindrical recess providing a seat for an anchor 78.

Figure 2:
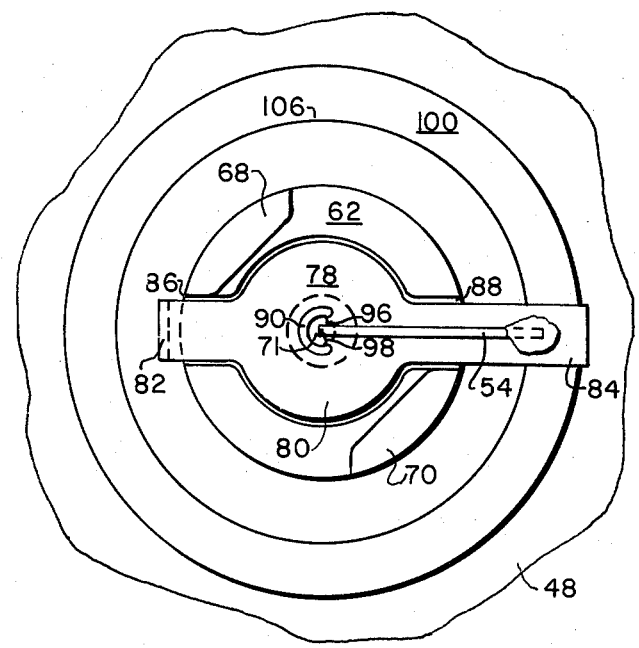
FIG. 2 is an enlarged view taken substantially along the line II—II of FIG. 1 and looking in the direction of the arrows.

Referring to FIG. 2, the anchor 78 is constructed of sheet brass and has a central disc or ring portion 80 with two arms 82 and 84 projecting in opposite directions from the disc portion. These arms project through notches 86 and 88 provided in the wall of tower 62. The disc 80 is further provided with a centrally disposed opening 90 and a tongue 92 extending over opening 90. This tongue has a cylindrically shaped surface portion 94 with ribs 96 and 98 on each side of the surface so as to define a groove for receiving taut band 54. Disc 80 may be secured to the base portion of tower 62 in any suitable manner as by cementing or staking.

As previously mentioned, taut band 54 is resiliently held at its outer end portion by tension spring 58. The taut band 54 passes through aperture 32 of screw 30, aperture 71 of tower 62 and through opening 90 of disc 80. The band 54 is then positioned within the groove formed by ribs 96 and 98 on tongue 92 and is secured to arm 84 of anchor 78.

Figure 3:
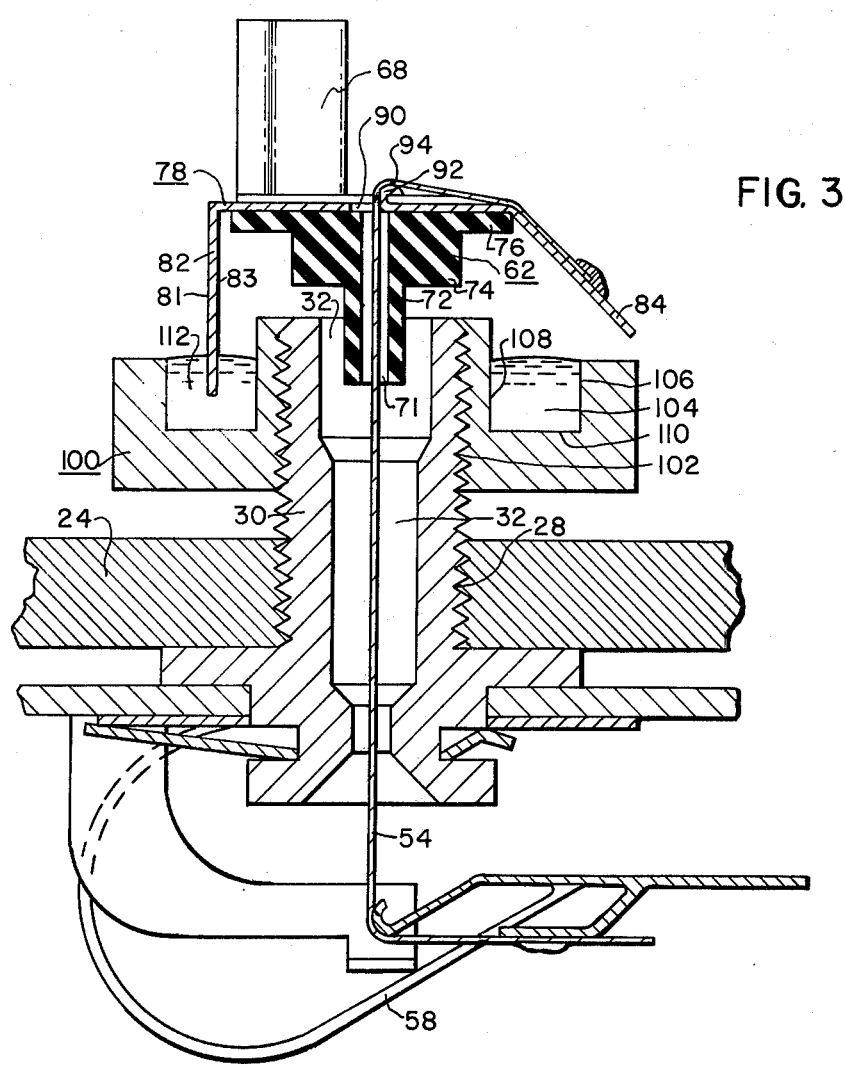
FIG. 3 is an enlarged view taken substantially along the line III—III of FIG. 1 and looking in the direction of the arrows.

Referring to FIG. 3, which is an enlarged view of FIG. 1 and which illustrates a damping arrangement made in accordance with the present invention, the damping member comprises arm 82 of anchor 78. Arm 82 is bent after passing through notch 86 so as to be generally lingitudinal with the axis of rotation of shaft 14. The arm 82 comprises surfaces 81 and 83 and a suitable distance between surfaces 81 and 83 is 0.008 inch. The anchor in tower 60 (not shown) does not have one of its arms bent as does anchor 78, but instead has its arms similarly positioned but 180° angularly displaced from each other.

Numeral 100 designates a receptacle member comprising a threaded aperture 102 and an annularly shaped outwardly open aperture or channel 104 which has an outer peripheral wall surface 106 an inner peripheral wall surface 108, and an end wall surface 110. The receptacle member 100 is threaded onto screw 30 such that the center of curvature of channel 104 is concentric with the axis of shaft 14.

Channel 104 is filled with a damping fluid 112 that is held within the open ended channel by capillary forces. To prevent the loss of fluid 112 during shipping or operation of the instrument, there must exist a suitable relationship between the dimensions of the channel 104 and the viscosity of the fluid 112. One such combination is the utilization of a polydimethylsiloxane of 30,000 centistokes as a liquid damping fluid contained within a channel having a distance between wall surfaces 106 and 108 of 0.042 inch and having a depth of 0.036 inch. An increase in the distance between wall surfaces 106 and 108, or an increase in the depth of the annular channel 104 will require the utilization of a more viscous damping fluid 112.

The receptacle member 100 is positioned so that a portion of the section of arm 82 that is bent generally longitudinally with the axis of shaft 14 extends into the damping fluid 112 that is held within the annular channel 104. The movement of arm 82 lateral to the axis of shaft 14 due to external shock is limited by the amount the tubular portion 72 of tower 62 can move laterally within aperture 32 of screw 30. The distance between outer wall surface 106 and surface 81 on arm 82 and the distance between inner wall surface 108 and surface 83 on arm 82 must be wide enough so that arm 82 cannot contact either of wall surfaces 106 and 108. The depth of channel 104 also must be deep enough so that arm 82 cannot touch end surface 110.

The annular channel 104 and arm 82 may be coated with an anti-wetting material to prevent loss of the damping fluid 112 from creep by the fluid from the channel 104. A suitable coating is a flurocarbon polymer soluble in either xylene hexafluoride or trichlorotrifluoroethane, such as the coating presently marketed under the tradenames NyeBar - type C or NyeBar - type F.

When the coil 12 is energized, flux flow is provided provided between attraction vanes 42 and 44 and through the repulsion vane 36 and the movable vane 34. As a result of this flux flow, a magnetic force is created between repulsion vane 36 and movable vane 34, thus producing relative movement between vanes 34 and 36. This relative movement will cause shaft 14 and arm 82 of anchor 78, which is fixed with respect to shaft 14, to rotate until the magnetic force causing rotation is equal and opposite to the opposing torque created by the twisting of taut bands 52 and 54. Damping is achieved by the movement of the generally longitudinal portion of arm 82 through the damping fluid 112 contained within the annular channel 104.

The amount of damping may be increased by either increasing the viscosity of the damping fluid 112 or by increasing the length of the section of arm 82 that is immersed within the damping fluid 112 or by doing both. The receptacle member 100 may be threaded higher or lower on screw 30 in order to adjust the length of the section of arm 82 that is immersed.

I claim as my invention:

1. An electrical measuring instrument comprising:
   a stator unit,
   a rotor unit,
   mounting means mounting the rotor unit on said stator unit for movement relative to said stator unit,
   damping means for damping said relative movement,
   said damping means comprising a receptable member carried by one of said units and having an outwardly opening aperture, said aperture having side and end walls, a damping member carried by the other of said units and having at least a portion thereof positioned within said aperture, and a highly viscous liquid damping fluid within said aperture and through which said portion of said damping member moves as a consequence of the relative movement of said units, the properties of said liquid fluid being so related to the dimensions of said aperture that said liquid fluid will be retained within said aperture against the force of gravity.

2. The electrical measuring instrument of claim 1 wherein said portion of said damping member is a fingerlike part projecting from said damping member.

3. The electrical measuring instrument of claim 1 wherein said mounting means establishes an axis about which said rotor unit rotates relative to said stator unit.

4. The electrical measuring instrument of claim 3 wherein said aperture is of annular shape, said annular aperture having its center of curvature concentric with said axis.

5. The electrical measuring instrument of claim 4 wherein said portion of said damping member is substantially arcuate in shape and said portion has a wall, said wall having inner and outer peripheral wall surfaces, said wall being positioned within said aperture with said damping fluid touching said inner and said outer peripheral wall surfaces.

6. An electrical measuring instrument comprising:
   a first vane of magnetic material,
   a second vane of magnetic material,
   mounting means mounting said first vane for rotation about an axis relative to said second vane,
   means providing a flux path through said vanes,
   a winding assembly providing flux flow through said flux path whereby force is created between said vanes to produce said relative movement between said vanes,
   damping means for damping said relative movement,
   said damping means comprising a receptacle member fixed with respect to one of said vanes and having an outwardly opening aperture, said aperture having side and end walls, a damping member fixed with respect to the other of said vanes and having at least a portion thereof positioned within said aperture, and a highly viscous liquid damping fluid within said aperture and through which said portion of said damping member moves as a consequence of said relative movement of said vanes, the properties of said liquid fluid being so related to the dimensions of said aperture that said liquid fluid will be retained therein against the force of gravity.

7. The electrical measuring instrument of claim 6 wherein said portion of said damping member is a fingerlike part projecting from said damping member.

8. The electrical measuring instrument of claim 6 wherein said aperture is of annular shape, said annular aperture having its center of curvature concentric with said axis.

9. The electrical measuring instrument of claim 8 wherein said mounting means comprises a taut band positioned along said axis and an anchor, said anchor having first and second arms and means securing an end portion of said taut band to said first arm, said damping member of said damping means including said second arm, said second arm extending generally longitudinally of said axis and into said aperture of said receptacle member, said second arm being radially outwardly spaced from said taut band.

10. An electrical measuring instrument comprising, a stator, a rotor, means mounting said rotor for rotational movement relative to said stator about an axis of rotation, an annular member carried by said stator concentrically of said axis of rotation, said annular member having an elongated outwardly opening arcuate aperture facing said rotor, a highly viscous liquid damping fluid within said aperture, the properties of said liquid fluid being so related to the dimensions of said aperture that said liquid fluid will be retained therein against the force of gravity, a damping member carried by said rotor and having a portion extending into said liquid fluid.

11. The instrument of claim 10 in which said liquid fluid is polydimethylsiloxane approximately 30,000 centistokes, the width of said aperture being approximately 0.042 inch, the depth of said aperture being approximately 0.036 inch.

12. The instrument of claim 11 in which said portion of said damping member has a thickness of approximately 0.008 inch.

13. The instrument of claim 10 in which said means for mounting said rotor includes a pair of taut bands resiliently carried by said stator, said bands suspending said rotor for rotational movement, one of said bands extending through said annular member, said elongated aperture being concentric with said one band, a plate-like mounting member secured to said rotor, said plate-like member having an aperture therethrough, said one band extending through said aperture of said plate-like member and secured to said plate-like member, said damping member being an extending arm portion of said plate-like member and extending generally parallel to said one band and into said elongated aperture of said annular member.

* * * * *